United States Patent
Lee et al.

(10) Patent No.: US 9,898,681 B2
(45) Date of Patent: Feb. 20, 2018

(54) APPARATUS AND METHOD FOR DETECTING OBJECT USING MULTI-DIRECTIONAL INTEGRAL IMAGE

(71) Applicant: ELECTRONICS AND TELECOMMUNICATIONS RESEARCH INSTITUTE, Daejeon (KR)

(72) Inventors: Dae-Ha Lee, Daejeon (KR); Cheon-Shu Park, Daejeon (KR); Min-Su Jang, Daejeon (KR); Jae-Hong Kim, Daejeon (KR); Jong-Hyun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 167 days.

(21) Appl. No.: 14/529,767

(22) Filed: Oct. 31, 2014

(65) Prior Publication Data

US 2016/0110631 A1 Apr. 21, 2016

(30) Foreign Application Priority Data

Oct. 20, 2014 (KR) .................. 10-2014-0141988

(51) Int. Cl.
*G06K 9/00* (2006.01)
*G06K 9/46* (2006.01)
*G06K 19/06* (2006.01)

(52) U.S. Cl.
CPC ......... *G06K 9/4647* (2013.01); *G06K 9/4614* (2013.01); *G06K 2019/06253* (2013.01)

(58) Field of Classification Search
CPC .................................................. G06K 9/4614
See application file for complete search history.

(56) References Cited

U.S. PATENT DOCUMENTS 9,135,521 B2 *   9/2015   Lim ..................... G06K 9/4647
2006/0181740 A1 * 8/2006   Kim ..................... H04N 19/176
                                              358/3.26

(Continued)

OTHER PUBLICATIONS

Daeha Lee and Jaehong Kim, "Object detection using Directional Integral Image", Nov. 2, 2013, 10$^{th}$ International Conference on Ubiquitous Robots and Ambient Intelligence, p. 285-286.*

*Primary Examiner* — Gandhi Thirugnanam
(74) *Attorney, Agent, or Firm* — Ladas & Parry LLP

(57) ABSTRACT

An apparatus and method for detecting an object using a multi-directional integral image are disclosed. The apparatus includes an area segmentation unit, an integral image calculation unit, and an object detection unit. The area segmentation unit places windows having a size of x*y on a full image having w*h pixels so that they overlap each other at their edges, thereby segmenting the full image into a single area, a double area and a quadruple area. The integral image calculation unit calculates a single directional integral image for the single area, and calculates multi-directional integral images for the double and quadruple areas. The object detection unit detects an object for the full image using the single directional integral image and the multi-directional integral images.

19 Claims, 22 Drawing Sheets

(56) References Cited

U.S. PATENT DOCUMENTS

| | | | | |
|---|---|---|---|---|
| 2008/0159630 | A1* | 7/2008 | Sharon | G06T 7/0085 382/199 |
| 2009/0238460 | A1* | 9/2009 | Funayama | G06K 9/4671 382/181 |
| 2010/0304053 | A1* | 12/2010 | Katschorek | B42D 25/29 428/29 |
| 2011/0058741 | A1* | 3/2011 | Ito | G06K 9/00973 382/173 |
| 2011/0211233 | A1* | 9/2011 | Yokono | G06K 9/00973 358/474 |
| 2012/0300090 | A1* | 11/2012 | Aviv | G06K 9/00228 348/222.1 |
| 2014/0023232 | A1* | 1/2014 | Kim | G06K 9/00624 382/103 |
| 2015/0178934 | A1* | 6/2015 | Yokono | G06K 9/00375 382/103 |

\* cited by examiner

-- PRIOR ART --

-- PRIOR ART --

-- PRIOR ART --

-- PRIOR ART --

$\sum_{r \leq tR,\ c \leq tC} (tR, tC)$ : 4 DIRECTIONAL INTEGRAL IMAGE $\sum A = (0) + (1)$ $\sum B = (0) + (3)$ $\sum C = (0) + (1) + \cdots + (8)$

| $\sum_{r,c}$ (tR, tC) | 1-DII (r ≥ tR, c ≥ tC) | 2-DII (r ≥ tR, c ≤ tC) | 3-DII (r ≤ tR, c ≥ tC) | 4-DII (r ≤ tR, c ≤ tC) |
|---|---|---|---|---|
| $\sum$ (0, 0) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) |
| $\sum$ (0, 1) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) |
| $\sum$ (0, 2) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) |
| $\sum$ (1, 0) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) |
| $\sum$ (1, 1) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) |
| $\sum$ (1, 2) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) |
| $\sum$ (2, 0) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) |
| $\sum$ (2, 1) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) |
| $\sum$ (2, 2) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) | (0)(1)(2)<br>(3)(4)(5)<br>(6)(7)(8) |

FIG. 7

APPARATUS AND METHOD FOR DETECTING OBJECT USING MULTI-DIRECTIONAL INTEGRAL IMAGE

CROSS-REFERENCE TO RELATED APPLICATION

This application claims the benefit of Korean Patent Application No. 10-2014-0141988, filed Oct. 20, 2014, which is hereby incorporated by reference herein in its entirety.

BACKGROUND

1. Technical Field

The present disclosure relates generally to an apparatus and method for detecting an object using a multi-directional integral image and, more particularly, to an apparatus and method for detecting an object using a multi-directional integral image, which are capable of reducing the amount of computation for an overlap area using a multi-directional integral image in the calculation of partial integral images required for the detection of an object.

2. Description of the Related Art

In general, In order to detect an object, a machine learning process of learning the corresponding object is required. In the case of the Adaboost algorithm that is chiefly used as a machine learning method for such machine learning, an object is detected using an integral image.

FIGS. 1A and 1B are diagrams illustrating an example of a conventional method of detecting an object using an integral image.

Referring to FIG. 1A, in the conventional method of detecting an object using an integral image, an integral image 103 is obtained from a full image 102 that is formed by obtaining the pixel values of an original image 101 having w*h pixels.

In this case, each of w and h is one of natural numbers, and w may correspond to width and h may correspond to height.

In the integral image 103, a value corresponding to each pixel is a value that is obtained by adding all the values of pixels that are defined by pixels ranging from the corresponding pixel to the leftmost pixel in a lateral direction and pixels ranging from the corresponding pixel to the uppermost pixel in a vertical direction.

Referring to FIG. 1B, in the conventional method of detecting an object using an integral image, an object is detected along a lateral direction 111, a vertical direction 112 and a diagonal direction 113 using an integral image 103 and an object pattern 110 having a size of m*n.

In this case, each of m and n is one of natural numbers, wherein m and n are smaller than w and h, respectively, and m may correspond to the lateral length of the object pattern 110, and n may correspond to the vertical length of the object pattern 110.

FIGS. 2A and 2B are diagrams illustrating an example of the numbers of bits required for the conventional method of detecting an object using an integral image.

FIG. 2A is a full image formed by obtaining the pixel values of an original image, and FIG. 2B is an integral image calculated from FIG. 2A.

In this case, the value of a pixel at the lower right corner of FIG. 2B corresponds to a value obtained by adding the values of all the pixels of the full image of FIG. 2A, and a large number of bits are required to store such a value.

In particular, in the case of FIG. 2B, as the resolution of a full image increases, an exponentially increasing amount of memory is required to calculate a related integral image.

In order to overcome the above problem, an object may be detected using partial integral images.

FIGS. 3A and 3B are diagrams illustrating an example of a conventional method of detecting an object using partial integral images.

Referring to FIG. 3A, in the conventional method of detecting an object using partial integral images, a full image 301 is segmented into areas 311, 312 and 313 having a size of x*y, and integral images 321, 322 and 323 are calculated from the areas 311, 312 and 313, respectively.

In this case, each of x and y is one of natural numbers, wherein x and y are smaller than w and h, respectively, x may correspond to the lateral length of the partial areas 311, 312 and 313, and y may correspond to the vertical length of the partial areas 311, 312 and 313.

Referring to FIG. 3B, in the conventional method of detecting an object using an integral image, an object is detected along a lateral direction 321, a vertical direction 322 and a diagonal direction 323 using integral images 321, 322 and 323 and an object pattern 330 having a size of m*n.

In this case, each of m and n is one of natural numbers, wherein m and n are smaller than x and y, respectively, m may correspond to the lateral length of the object pattern 330, and n may correspond to the vertical length of the object pattern 330.

FIG. 4 is a diagram illustrating an example of an overlap computational area occurring in the conventional method of detecting an object using partial integral images.

Referring to FIG. 4, in the conventional method of detecting an object using partial integral images, when the full image 301 is segmented into the areas 311, 312 and 313 having a predetermined size, an overlap corresponding to the area of the object pattern is made in order to ensure the continuity of object detection, and thus an overlap area 410 occurs.

In this case, the number of overlap areas 410 increases in proportion to the size of the full image, in inverse proportion to the size of the partial images, and in proportion to the size of the area of the object pattern.

For example, when an integral image 322 is generated after an integral image 321 has been generated, overlap areas 421 and 422 occur, and the amount of computation increases as if an integral image is generated once more.

That is, with respect to the integral images 321, 322 and 323, the amount of computation is increased by a value corresponding to the overlap areas 422 and 423.

As a result, when an integral image is calculated using a full image, a problem arises in that an exponentially increasing amount of memory is required. When partial integral images are used in order to overcome the above problem, another problem arises in that the amount of computation increases in order to calculate an overlap area.

U.S. Patent Application Publication No. 2006-0181740 discloses a device and method for eliminating a block artifact phenomenon, and introduces a technology for segmenting an image frame into blocks and then determining the edges thereof.

However, this conventional technology cannot also overcome the problem of an increase in the amount of computation attributable to an overlap area in the use of partial integral images.

Therefore, there is an urgent need for a new object detection technology that is capable of calculating each partial integral image along a specific direction and utilizing an intersection integral image and a multi-directional integral image, thereby reducing the amount of computation for an overlap area.

SUMMARY

At least some embodiments of the present invention are directed to the provision of an apparatus and method for detecting object using a multi-directional integral image, which are capable of, in the calculation of partial integral images required for the detection of an object, performing calculations along four different directions with respect to a non-overlap area and calculating an intersection integral image for overlap directions with respect to an overlap area, thereby reducing the amount of computation for the overlap area.

In accordance with an aspect of the present invention, there is provided an apparatus for detecting an object using a multi-directional integral image, including an area segmentation unit configured to place windows having a size of x*y on a full image having w*h pixels so that they overlap each other at their edges, thereby segmenting the full image into a single area, a double area and a quadruple area; an integral image calculation unit configured to calculate a single directional integral image for the single area and calculate multi-directional integral images for the double and quadruple areas; and an object detection unit configured to detect an object for the full image using the single directional integral image and the multi-directional integral images; wherein each of w and h is one of natural numbers, and each of x and y is one of natural numbers, wherein x and y are smaller than w and h, respectively.

A single direction may be assigned to each of the windows, and one direction may be assigned to the single area, two directions may be assigned to the double area, and four directions may be assigned to the quadruple area.

The integral image calculation unit may include a single directional integral image calculation unit configured to calculate a single directional integral image for each of the single, double and quadruple areas along a single direction; an intersection integral image calculation unit configured to calculate intersection integral images for each of the double and quadruple areas along two directions; and a multi-directional integral image calculation unit configured to calculate multi-directional integral images for the double and quadruple areas using the single directional integral images and the intersection integral images.

The single directional integral image calculation unit may calculate a single directional integral image along the direction assigned to the single area with respect to the single area, may calculate a single directional integral image along any one of the two directions assigned to the double area with respect to the double area, and may calculate a single directional integral image along any one of the four directions assigned to the quadruple area with respect to the quadruple area.

The intersection integral image calculation unit may calculate intersection integral images along the two directions assigned to the double area with respect to the double area, and may calculate three intersection integral images along any three pairs of the four non-opposite direction pairs of the four directions assigned to the quadruple area with respect to the quadruple area.

The multi-directional integral image calculation unit may calculate the multi-directional integral image by subtracting the intersection integral image from the sum of single directional integral images along the respective directions assigned to the double area with respect to the double area, and may calculate the multi-directional integral image by subtracting the three intersection integral images from the sum of single directional integral images along the respective directions assigned to the quadruple area with respect to the quadruple area.

Two different directions may be assigned to the double area, and four different directions may be assigned to the quadruple area.

Any one of the four different directions may be assigned to each of the windows.

The left and right side windows of first direction windows having a first direction may be second direction windows having a second direction, the upper and lower side windows of the first direction windows may be third direction windows having a third direction, and the upper and lower side windows of the second direction windows and the left and right side windows of the third direction windows may be fourth direction windows having a fourth direction.

The direction assigned to each of the windows may be a direction along which pixel values within the window are integrated, and the first direction may be a rightward-downward direction, the second direction may be a leftward-downward direction, the third direction may be a rightward-upward direction, and the fourth direction may be a leftward-upward direction.

In accordance with another aspect of the present invention, there is provided a method of detecting an object using a multi-directional integral image, including placing windows having a size of x*y on a full image having w*h pixels so that they overlap each other at their edges, thereby segmenting the full image into a single area, a double area and a quadruple area; calculating a single directional integral image for the single area, and calculating multi-directional integral images for the double and quadruple areas; and detecting an object for the full image using the single directional integral image and the multi-directional integral images; wherein each of w and h is one of natural numbers, and each of x and y is one of natural numbers, wherein x and y are smaller than w and h, respectively.

A single direction may be assigned to each of the windows, and one direction is assigned to the single area, two directions may be assigned to the double area, and four directions may be assigned to the quadruple area.

Calculating the integral images may include calculating a single directional integral image for each of the single, double and quadruple areas along a single direction; calculating intersection integral images for each of the double and quadruple areas along two directions; and calculating multi-directional integral images for the double and quadruple areas using the single directional integral images and the intersection integral images.

Calculating the single directional integral images may include, with respect to the single area, calculating a single directional integral image along the direction assigned to the single area; with respect to the double area, calculating a single directional integral image along any one of the two directions assigned to the double area; and, with respect to the quadruple area, calculating a single directional integral image along any one of the four directions assigned to the quadruple area.

Calculating the intersection integral images comprises, with respect to the double area, calculating intersection integral images along the two directions assigned to the double area; and, with respect to the quadruple area, calculating three intersection integral images along any three pairs of the four non-opposite direction pairs of the four directions assigned to the quadruple area.

Calculating the multi-directional integral images may include, with respect to the double area, calculating the multi-directional integral image by subtracting the intersection integral image from the sum of single directional integral images along the respective directions assigned to the double area; and, with respect to the quadruple area, calculating the multi-directional integral image by subtracting the three intersection integral images from the sum of single directional integral images along the respective directions assigned to the quadruple area.

Two different directions may be assigned to the double area, and four different directions may be assigned to the quadruple area.

Any one of the four different directions may be assigned to each of the windows.

The left and right side windows of first direction windows having a first direction may be second direction windows having a second direction, the upper and lower side windows of the first direction windows may be third direction windows having a third direction, and the upper and lower side windows of the second direction windows and the left and right side windows of the third direction windows may be fourth direction windows having a fourth direction.

The direction assigned to each of the windows may be a direction along which pixel values within the window are integrated, and the first direction may be a rightward-downward direction, the second direction may be a leftward-downward direction, the third direction may be a rightward-upward direction, and the fourth direction may be a leftward-upward direction.

BRIEF DESCRIPTION OF THE DRAWINGS

The above and other objects, features and advantages of the present invention will be more clearly understood from the following detailed description taken in conjunction with the accompanying drawings, in which:

FIGS. 5, 6A to 6D, and 7 are diagrams illustrating examples of methods of generating four different single directional integral images according to an embodiment of the present invention;

DETAILED DESCRIPTION

Figure 1A:
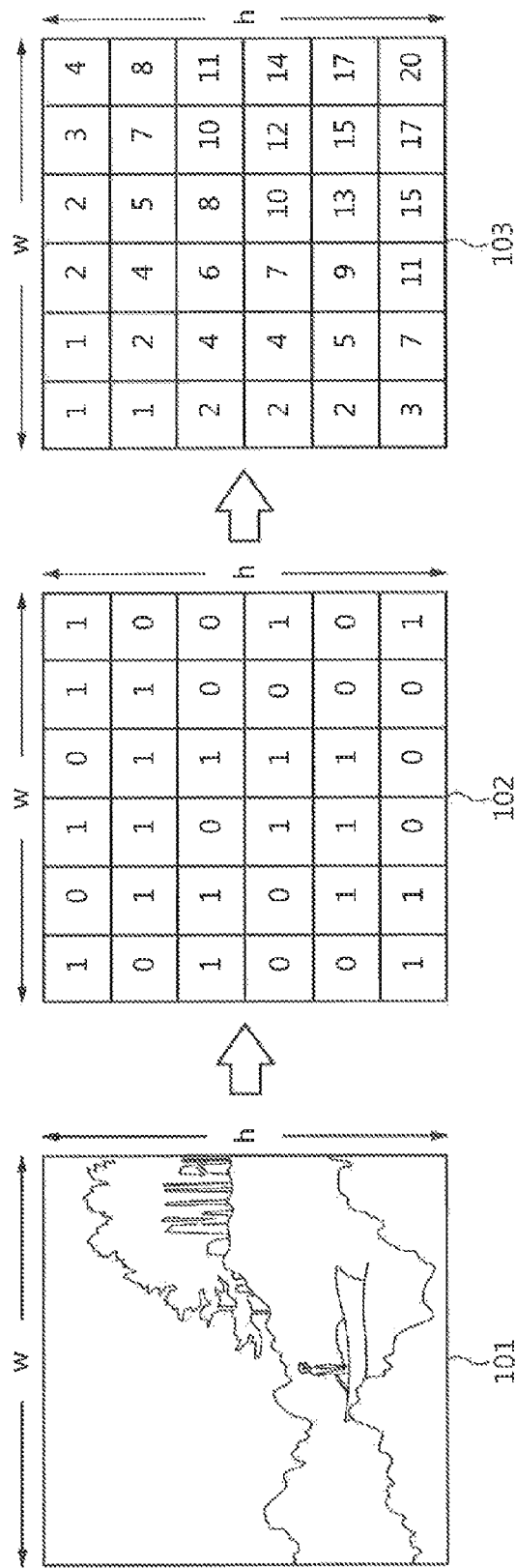
FIGS. 1A and 1B are diagrams illustrating an example of a conventional method of detecting an object using an integral image.
Figures 1B, 2A:
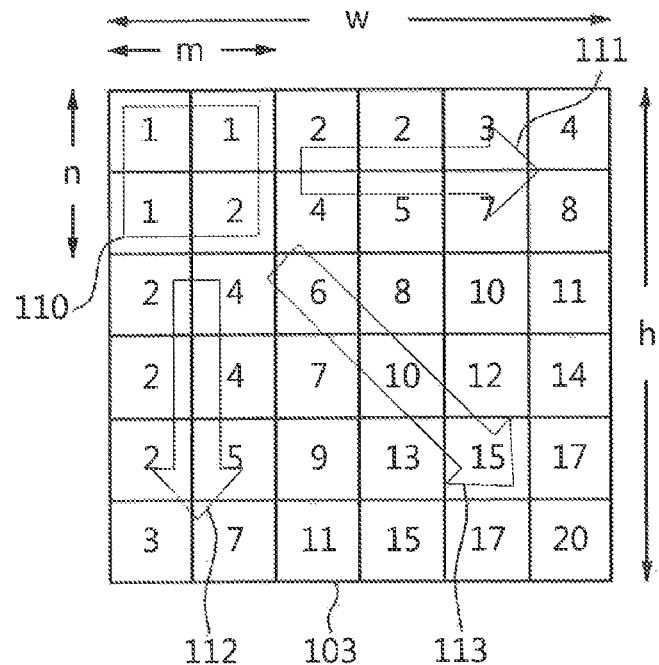
FIGS. 2A and 2B are diagrams illustrating an example of the numbers of bits required for the conventional method of detecting an object using an integral image.
Figure 2B:
Figure 3A:
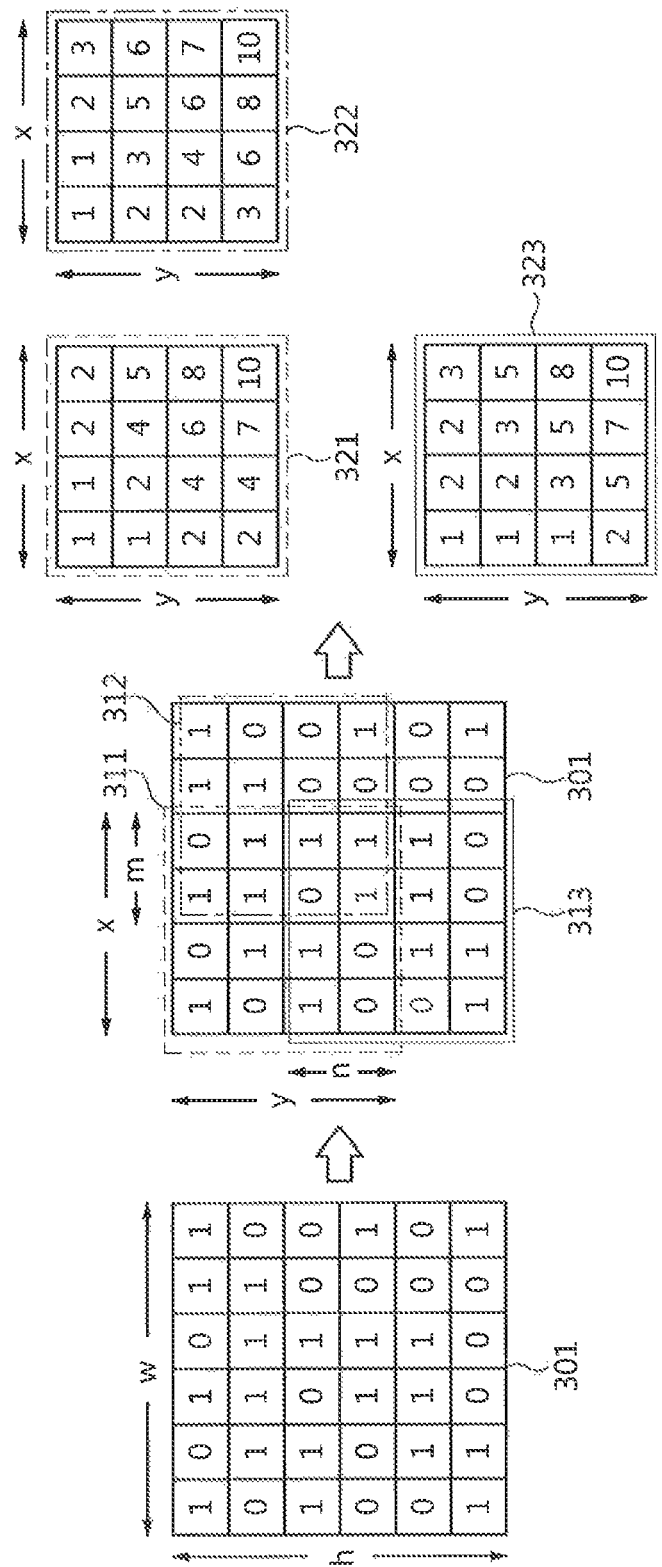
FIGS. 3A and 3B are diagrams illustrating an example of a conventional method of detecting an object using partial integral images.
Figure 3B:
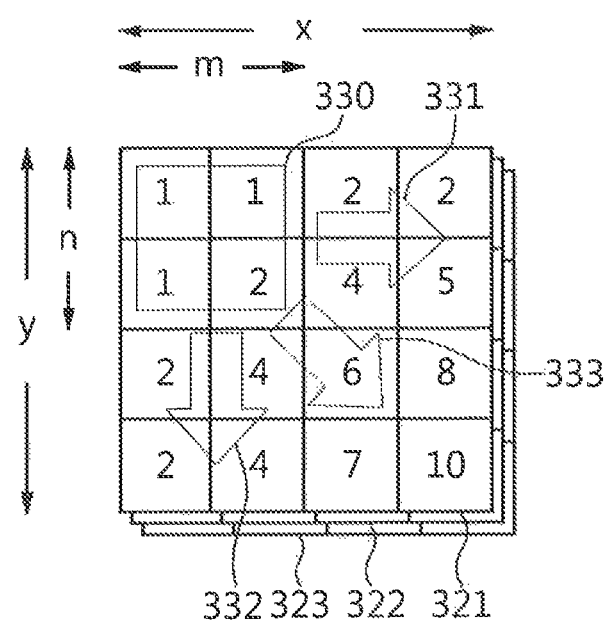
Figure 4:
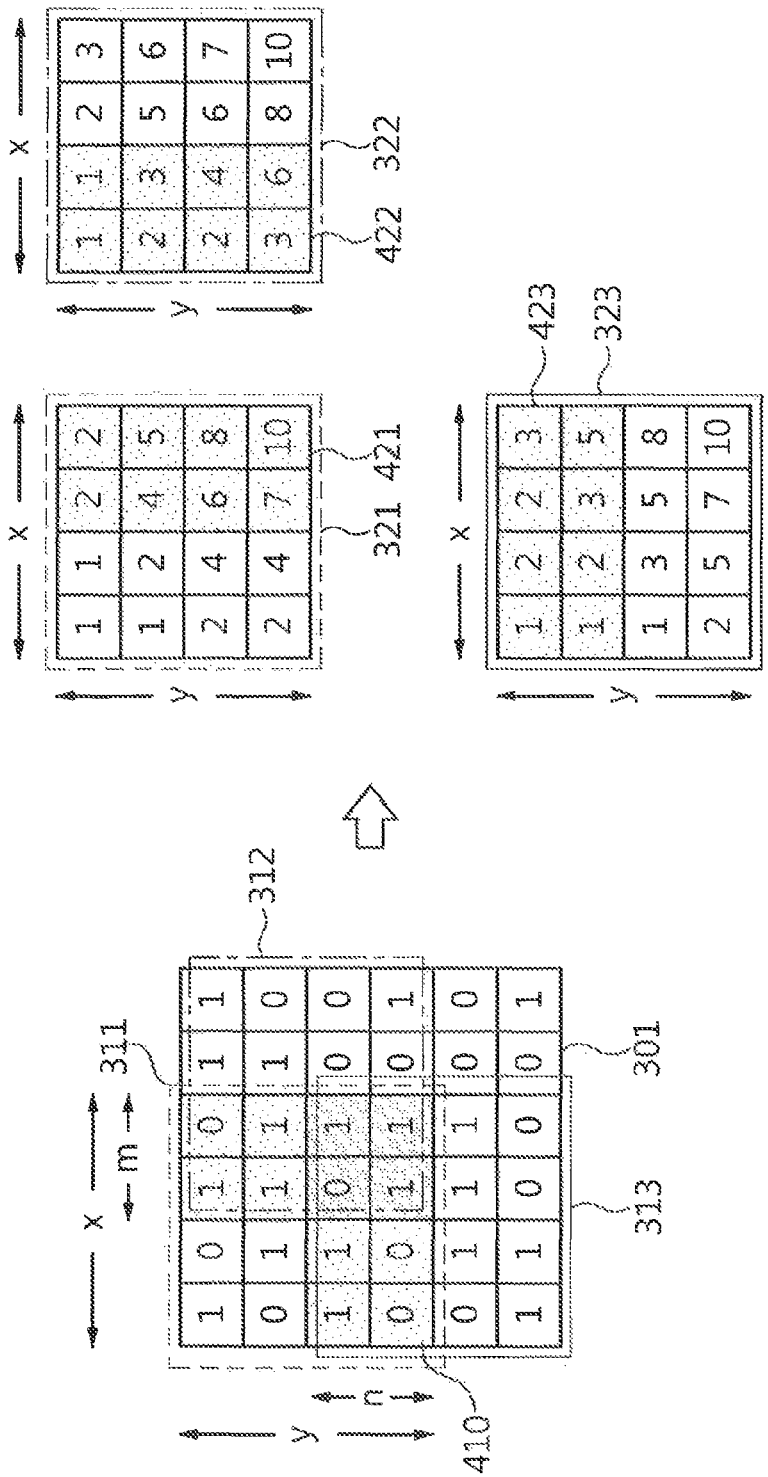
FIG. 4 is a diagram illustrating an example of an overlap computational area occurring in the conventional method of detecting an object using partial integral images.

Embodiments of the present invention will be described in detail below with reference to the accompanying drawings. Repeated descriptions and descriptions of well-known functions and configurations that have been deemed to make the gist of the present invention unnecessarily obscure will be omitted below. The embodiments of the present invention are intended to fully describe the present invention to persons having ordinary knowledge in the art to which the present invention pertains. Accordingly, the shapes, sizes, etc. of components in the drawings may be exaggerated to make the description obvious.

Embodiments of the present invention are described in detail below with reference to the accompanying drawings.

FIGS. 5, 6A to 6D and 7 are diagrams illustrating examples of methods of generating four different single directional integral images according to embodiments of the present invention.

Figure 5:
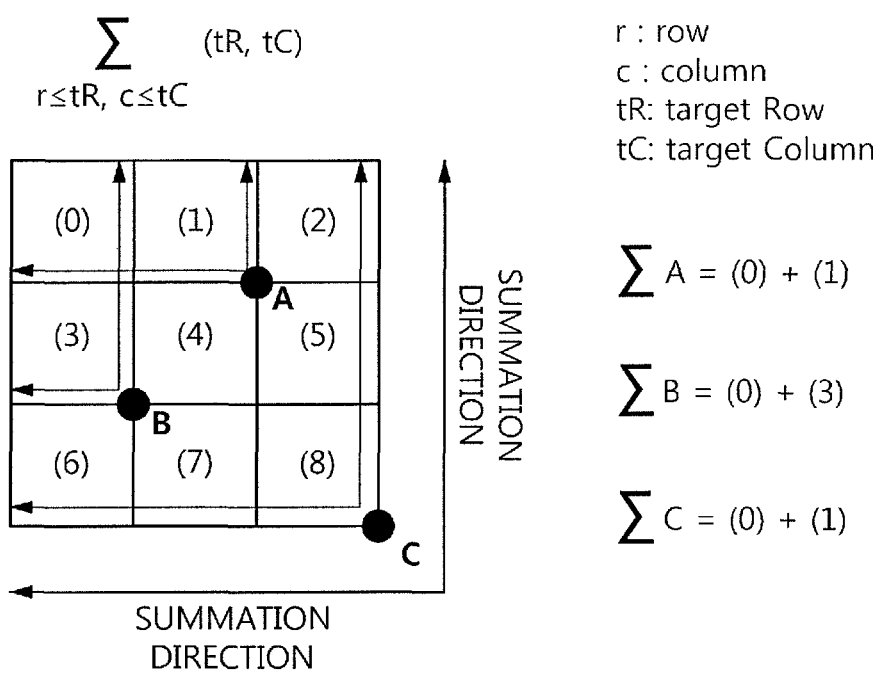

More specifically, FIG. 5 illustrates a method of calculating a single directional integral image corresponding to a leftward-upward direction (a fourth direction in the claims) according to an embodiment of the present invention.

Referring to FIG. 5, each pixel of a single directional integral image corresponding to the leftward-upward direction has a value that is obtained by adding all the values of pixels that are defined by pixels ranging from the corresponding pixel to the leftmost pixel in a lateral direction and pixels ranging from the corresponding pixel to the uppermost pixel in a vertical direction.

For example, in the case of a 3*3 original image having values of {{(0),(1),(2)}{(3),(4),(5)}{(6),(7),(8)}}, the value of pixel A(0,1) of the single directional integral image corresponding to the leftward-upward direction is a value that is obtained by adding (0) and (1) of an original image.

Figure 6A:
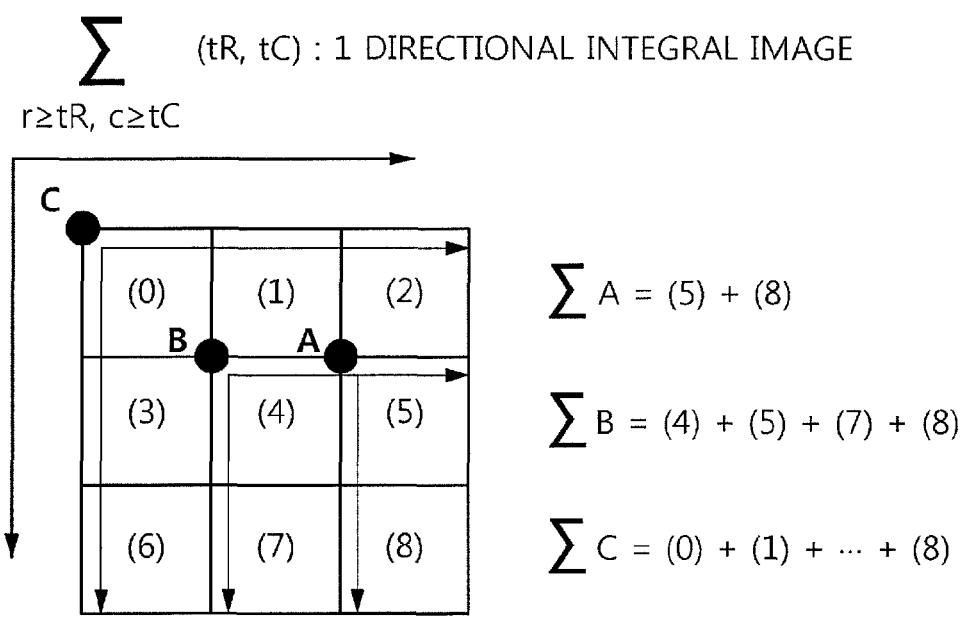
Figure 6B:
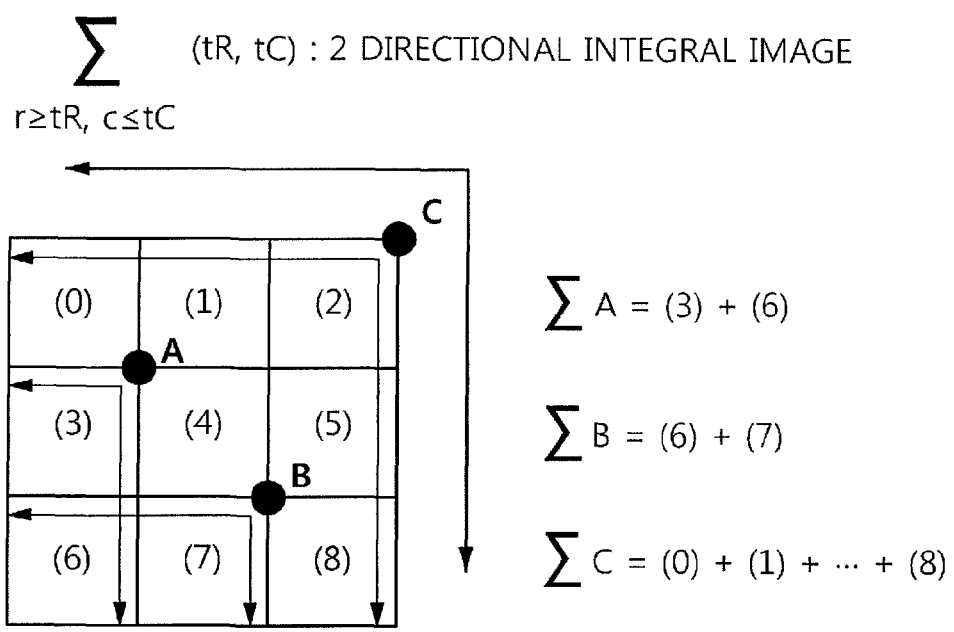
Figure 6C:
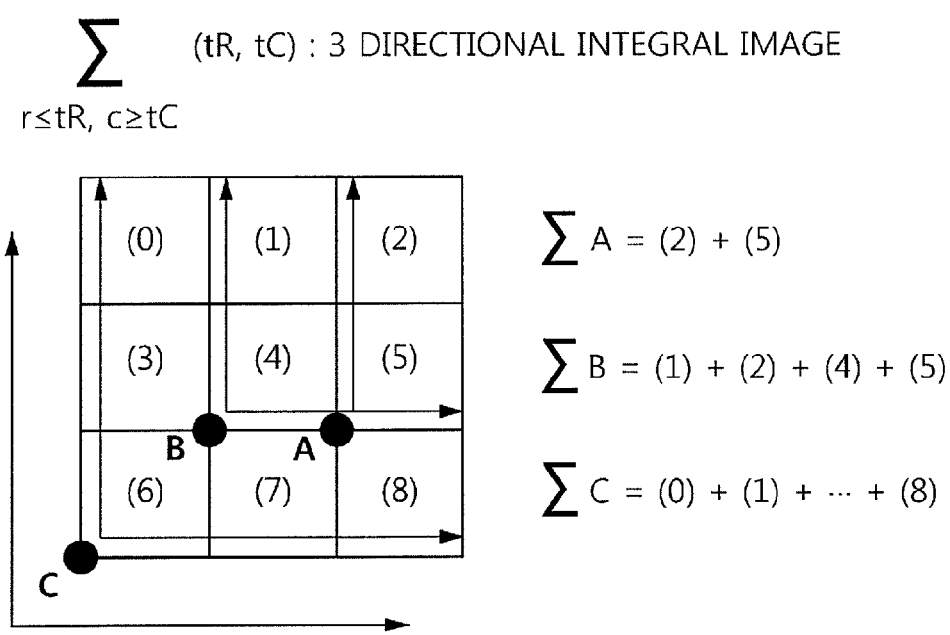
Figure 6D:
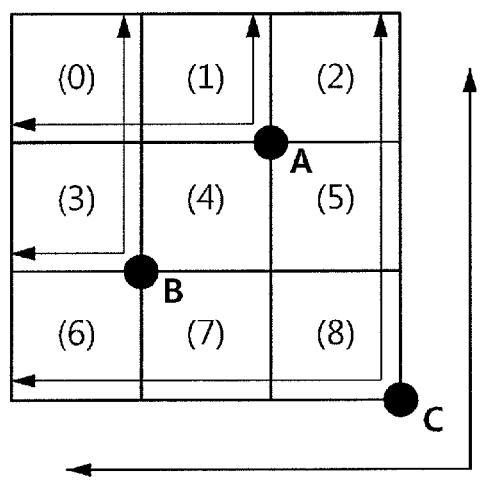

FIG. 6A illustrates a method of calculating a single directional integral image corresponding to a rightward-downward direction (a first direction in the claims), FIG. 6B illustrates a method of calculating a single directional integral image corresponding to a leftward-downward direction (a second direction in the claims), FIG. 6C illustrates a method of calculating a single directional integral image corresponding to a rightward-upward direction (a third direction in the claims), and FIG. 6D illustrates a method of calculating a single directional integral image corresponding to the leftward-upward direction (the fourth direction in the claims).

FIG. 7 is a table listing the methods of calculating a single directional integral image, which are illustrated in FIG. 6A to 6D.

For example, from FIG. 7, it can be seen that the single directional integral image corresponding to the rightward-downward direction corresponds to a 1-directional integral image (1-DII) column, and the (1,1) pixel value of 1-DII is a value that is obtained by adding the values (4), (5), (7) and (8) of the shaded portions of the original image.

FIGS. 8A to 8D are diagrams illustrating an example of a method of detecting an object using a combination of single directional integral images according to an embodiment of the present invention.

Figure 8A:
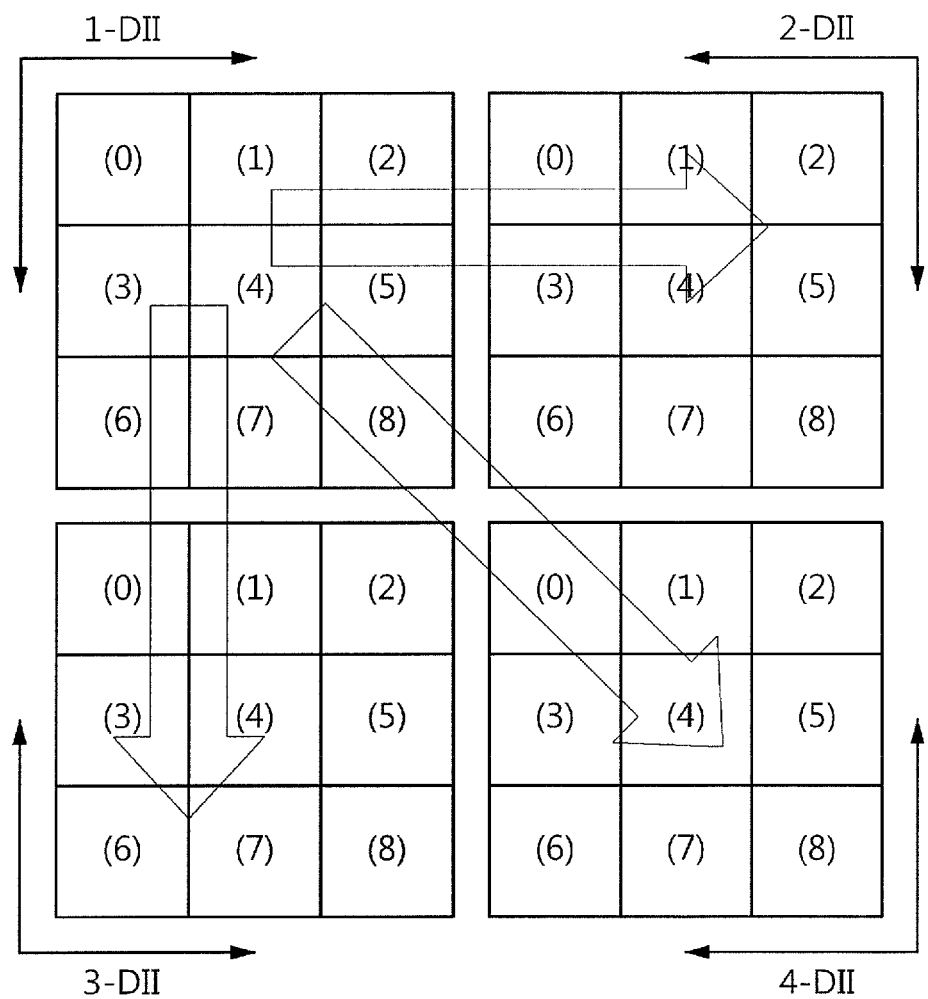
FIGS. 8A to 8D are diagrams illustrating an example of a method of detecting an object using a combination of single directional integral images according to an embodiment of the present invention.

Referring to FIG. 8A, in the method of detecting an object using a combination of single directional integral images according to the present embodiment, an object is detected along lateral, vertical and diagonal directions using four single directional integral images 1-DII, 2-DII, 3-DII and 4-DII as object patterns.

Figure 8B:
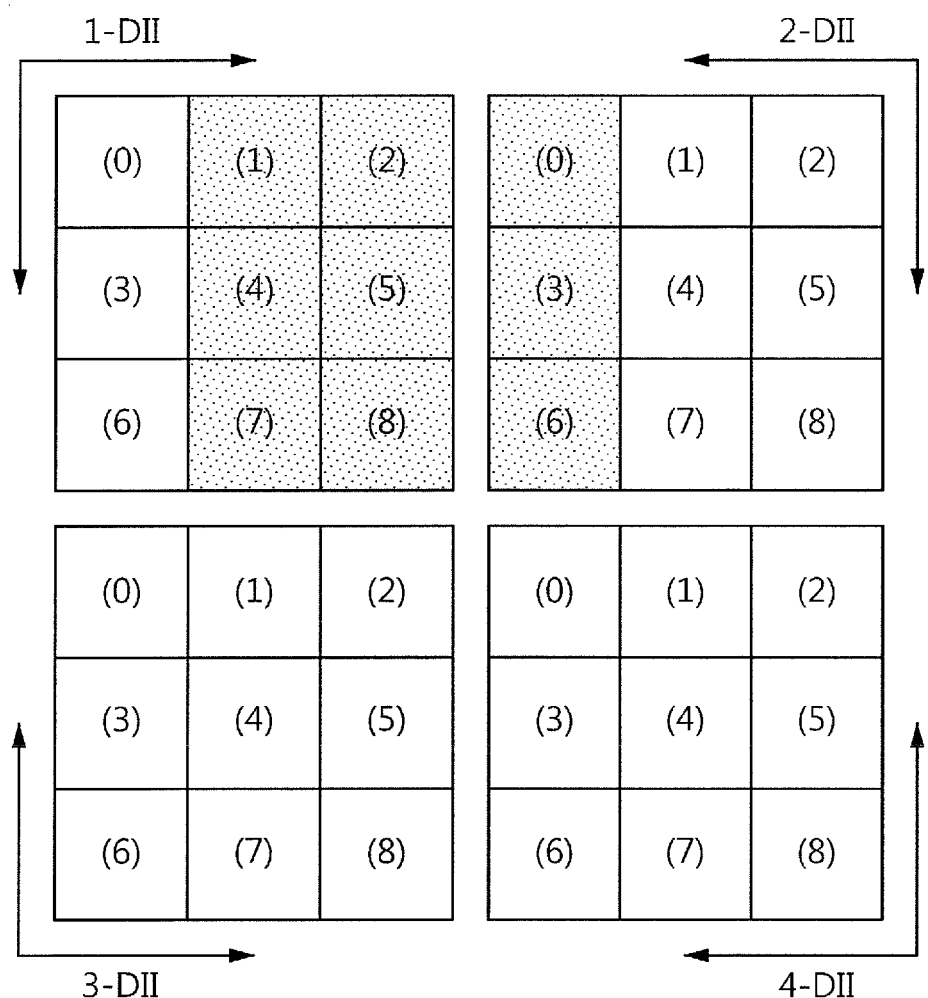
Figure 8C:
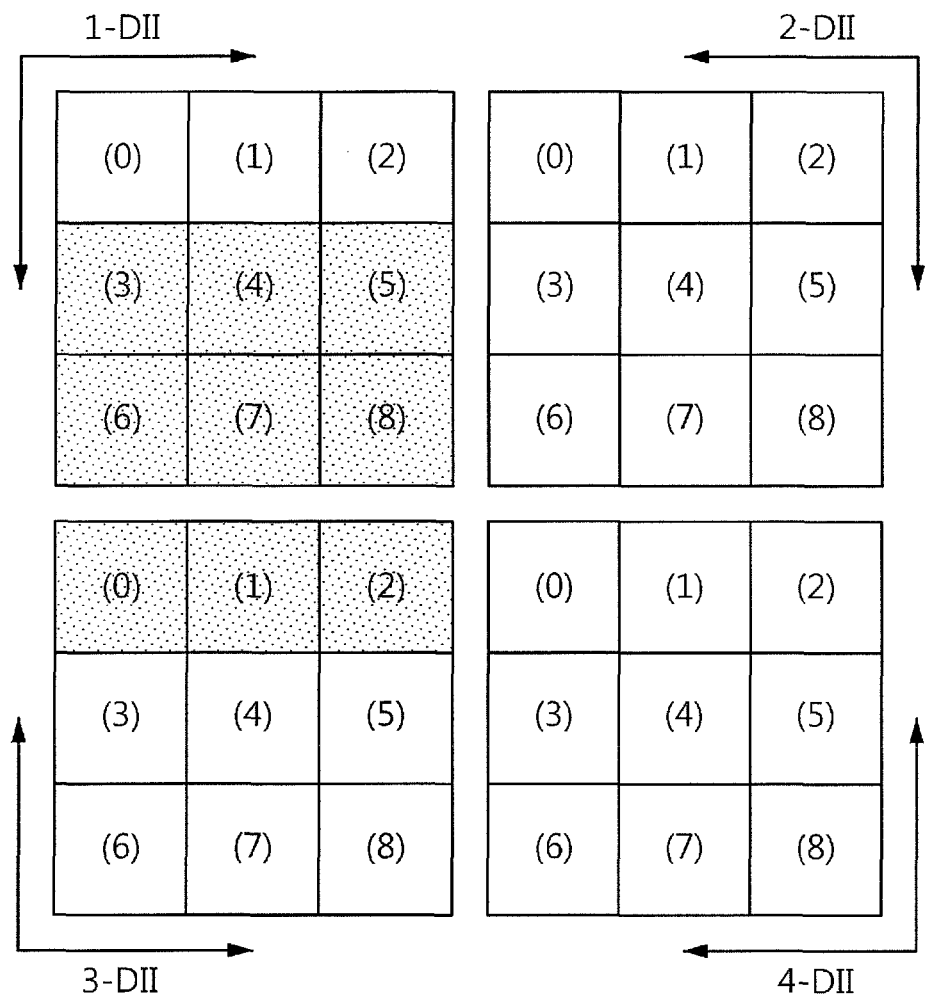
Figure 8D:
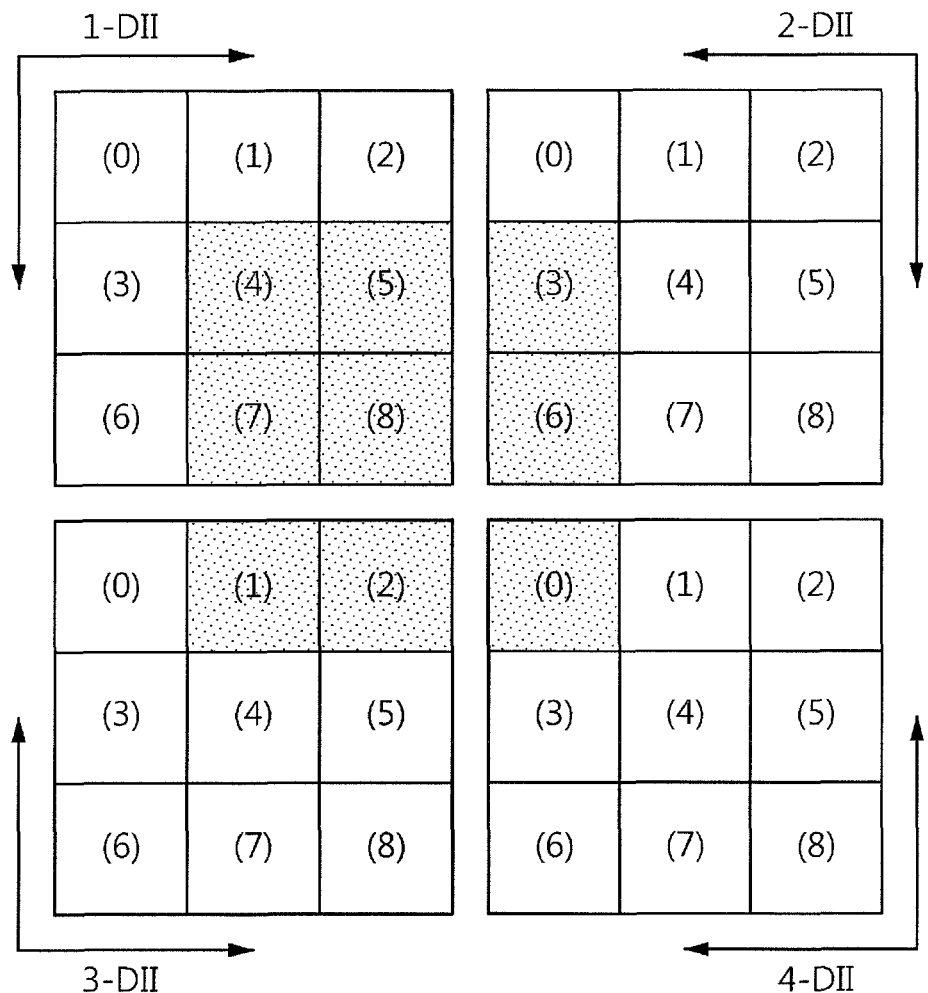

FIG. 8B illustrates an example of the case of detecting an object along the lateral direction, FIG. 8C illustrates an example of the case of detecting an object along the vertical direction, and FIG. 8D illustrates an example of the case of detecting an object along the diagonal direction.

In the case of FIG. 8B, shaded portions correspond to an object pattern area. A 1-directional integral image 1-DII and a 2-directional integral image 2-DII share the object pattern area, and thus the two single directional integral images 1-DII and 2-DII are used together to detect an object.

In the same manner, in the case of FIG. 8C, two single directional integral images 1-DII and 3-DII are used together to detect an object. In the case of FIG. 8D, all single directional integral images 1-DII, 2-DII, 3-DII and 4-DII share an object pattern area, and thus the four single directional integral images 1-DII, 2-DII, 3-DII and 4-DII are used together to detect an object.

That is, when each partial integral image has a different direction, as in the present invention, an object may be detected using only one single directional integral image in a single area having no overlap, an object may be detected using two single directional integral images together in a double area, and an object may be detected using four single directional integral images together in a quadruple area.

Figure 9A:
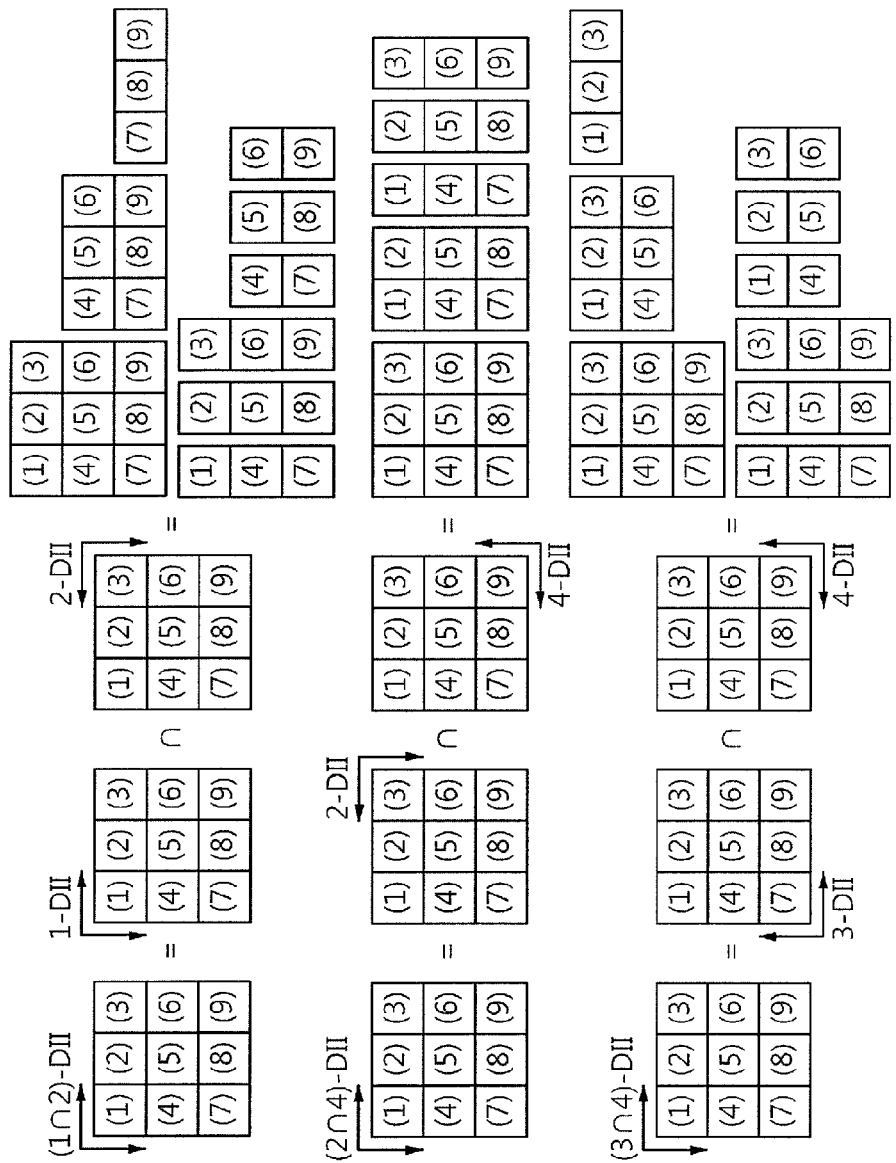
FIGS. 9A and 9B are diagrams illustrating an example of a method of calculating a multi-directional integral image according to an embodiment of the present invention.
Figure 9B:
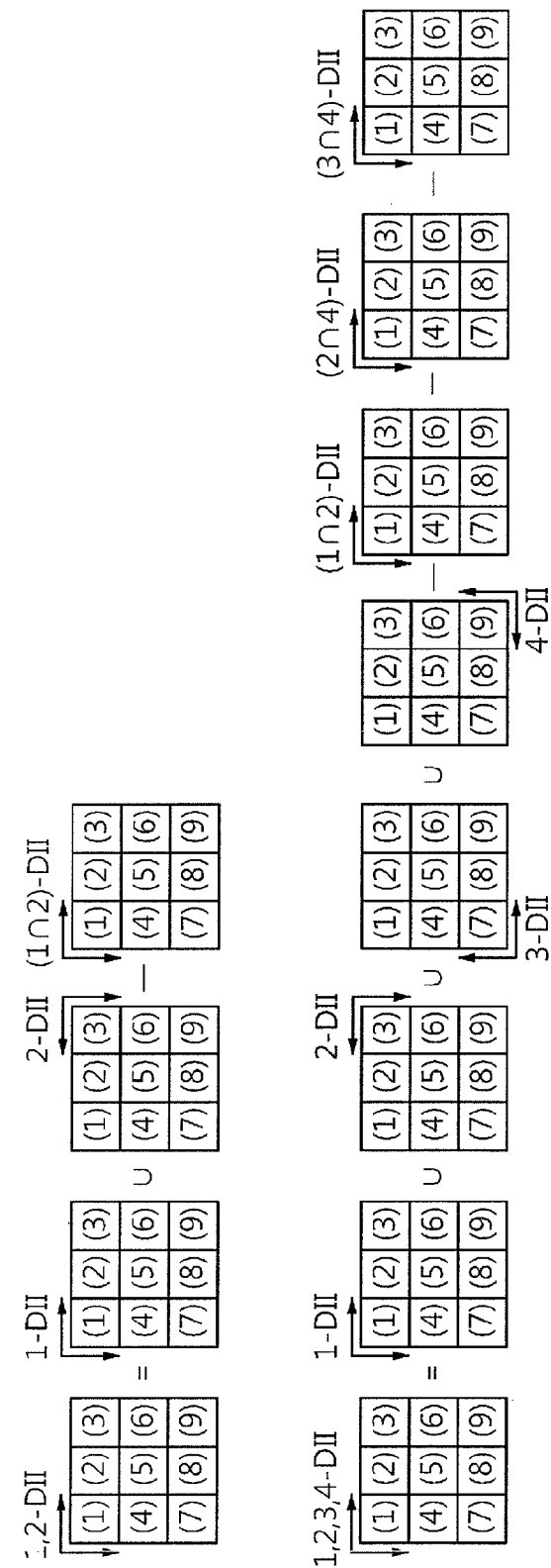

FIGS. 9A and 9B are diagrams illustrating an example of a method of calculating a multi-directional integral image according to an embodiment of the present invention.

Referring to FIGS. 9A and 9B, in the method of calculating a multi-directional integral image according to the present embodiment, in order to calculate 1 and 2-directional integral images 1,2-DII, an intersection integral image 1∩2-DII for first and second directions is generated, and then the intersection integral image 1∩2-DII is subtracted from the sum of a 1-directional integral image 1-DII and a 2-directional integral image 2-DII.

The method of calculating a multi-directional integral image according to the present embodiment can reduce the amount of computation for the calculation of a multi-directional integral image in an overlap area.

The amount of computation required to calculate a single directional integral image of an original image may be expressed as 2MN−(M+N). In this case, M and N are the lateral length and vertical length of the original image, respectively.

For example, the amount of computation required to calculate a single directional integral image for an original image having a size of 3*3 corresponds to 12 (2*3*3−(3+3)=12) calculations.

In the case of calculating 1,2-directional integral images 1,2-DII for an overlap area having a size of 3*3, the 1-directional integral image 1-DII and the 2-directional integral image 2-DII require a total of 24 (12+12=24) calculations.

In contrast, the method of generating an intersection integral image 1∩2-DII for first and second directions and subtracting the intersection integral image 1∩2-DII from a 1-directional integral image 1-DII and a 2-directional integral image 2-DII requires only 15 (24−9=15) calculations because the intersection integral image 1∩2-DII for the first and second directions requires only nine calculations common to the first and second directions.

Furthermore, in the case of calculating 1,2,3,4-directional integral images 1,2,3,4-DII for an overlap area having a size of 3*3, the method of calculating individual single directional integral images 1-DII, 2-DII, 3-DII and 4-DII requires a total of 48 (12+12+12+12=48) calculations.

In contrast, the method of generating an intersection integral image 1∩2-DII for first and second directions, an intersection integral image 2∩4-DII for second and fourth directions and an intersection integral image 3∩4-DII for third and fourth directions and subtracting them from the sum of single directional integral images requires only a total of 25 (48−9−5−9=25) calculations.

As described above, the method of calculating a multi-directional integral image according to the present embodiment can reduce the amount of computation for the calculation of a multi-directional integral image in an overlap area.

Figure 10A:
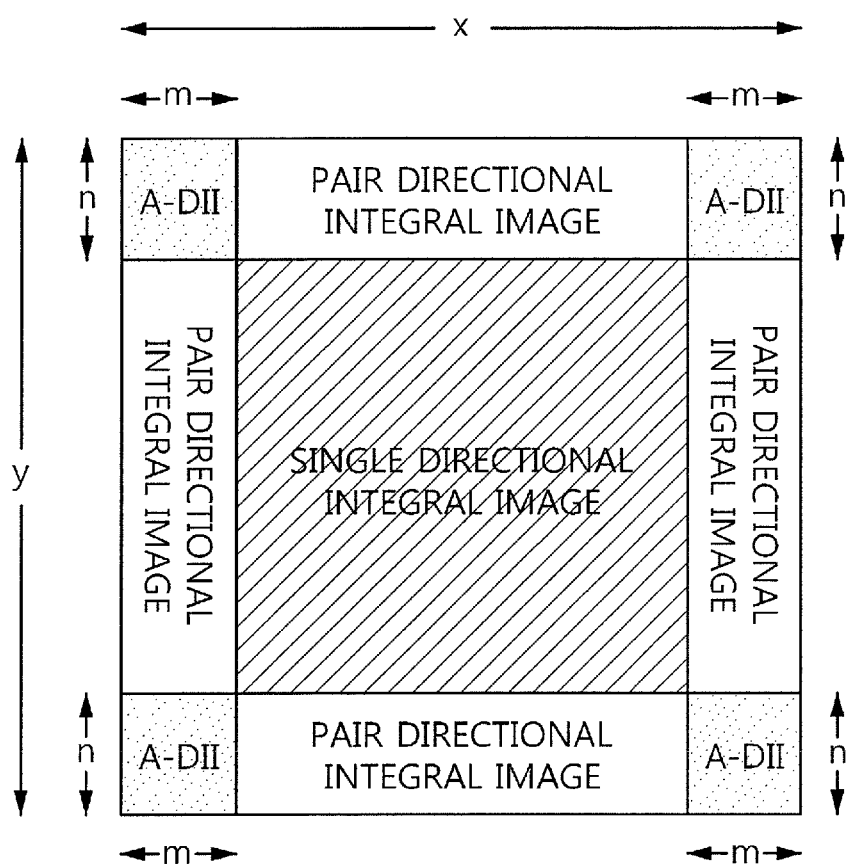
FIGS. 10A and 10B are diagrams illustrating an example of a method of segmenting an area according to an embodiment of the present invention.
Figure 10B:
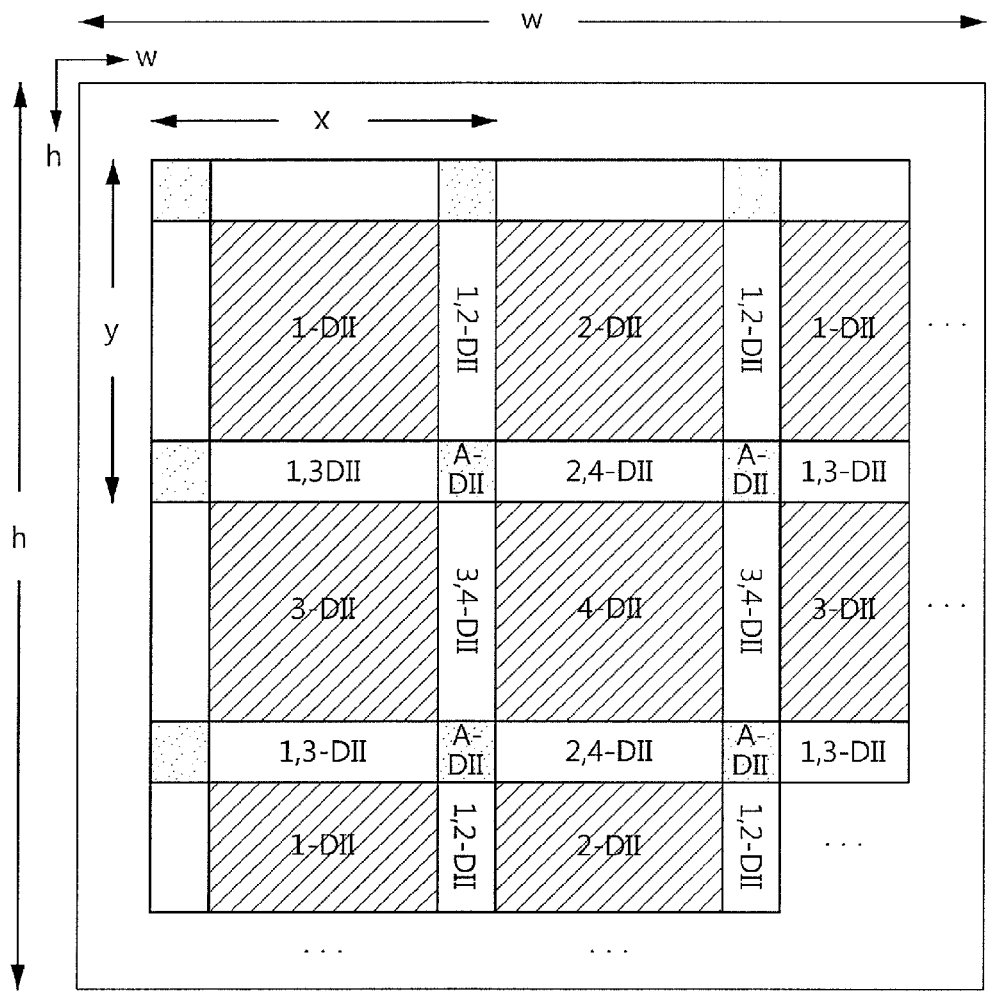

FIGS. 10A and 10B are diagrams illustrating an example of a method of segmenting an area according to an embodiment of the present invention.

Referring to FIGS. 10A and 10B, in the method of segmenting an area according to the present embodiment, windows having the same size are placed on a full image, thereby segmenting the full image into a single area, a double area and a quadruple area.

Referring to FIG. 10A, a single window is classified as a single area corresponding to a non-overlap area, a double area overlapping a single window, and a quadruple area overlapping three windows, depending on weather the window overlaps one or more adjacent windows.

A single direction is assigned to each window, and a single area corresponds to a single directional integral image area where an integral image is calculated only along the direction of a corresponding window. The double area corresponds to a multi-directional integral image area where an integral image is calculated along the direction of a corresponding window and the direction of an overlap window. The quadruple area corresponds to a multi-directional integral image area where an integral image is calculated along all the directions of four overlap windows.

For example, a single area of a window to which the first direction has been assigned corresponds to a 1-DII area, a double area where a window to which the first direction has been assigned and a window to which the second direction has been assigned overlap each other corresponds to a 1,2-DII area, and a quadruple area where a window to which the first direction has been assigned, a window to which the second direction has been assigned, a window to which the third direction has been assigned and a window to which the fourth direction has been assigned corresponds to a 1,2,3, 4-DII area or a A-DII (All-DII).

Figure 11:
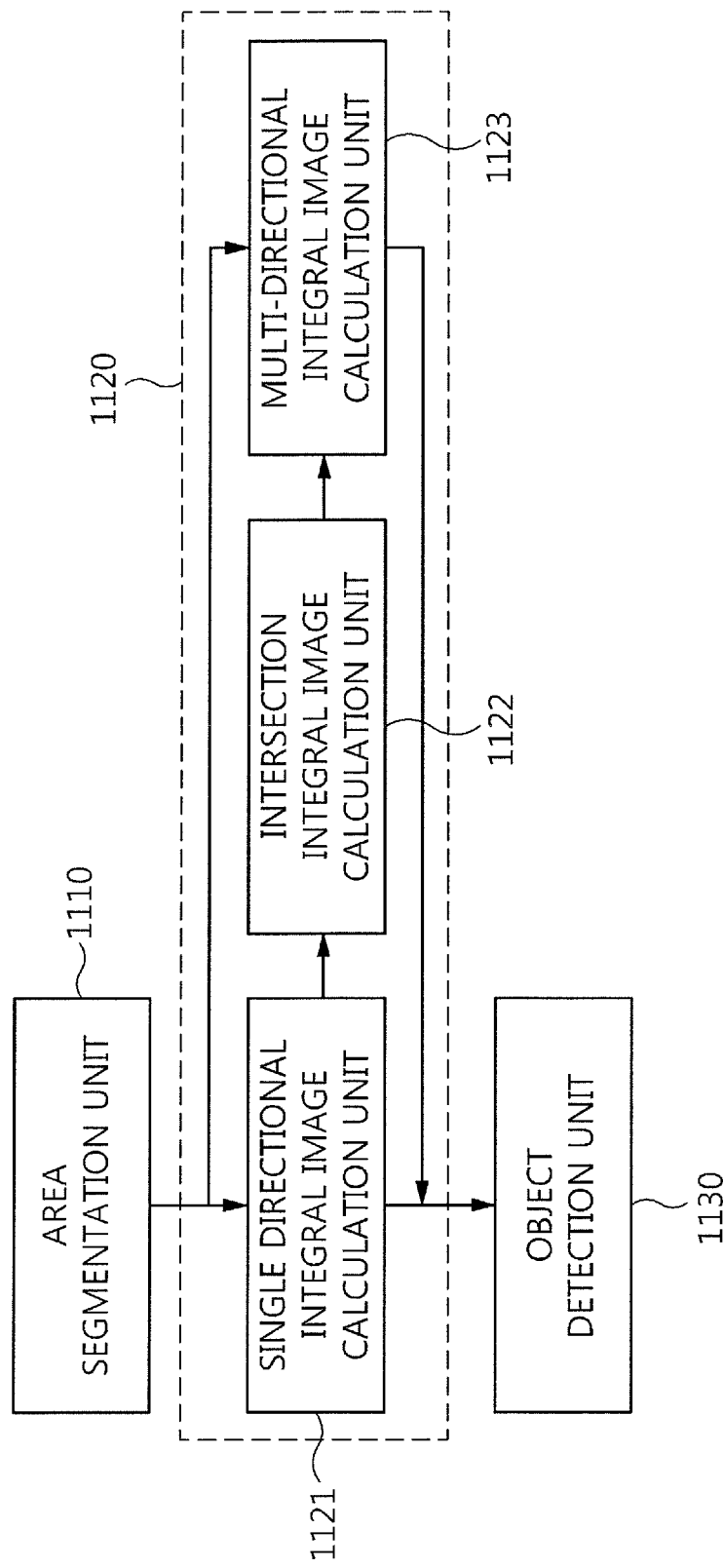
FIG. 11 is a block diagram illustrating an apparatus for detecting an object using a multi-directional integral image according to an embodiment of the present invention.

FIG. 11 is a block diagram illustrating an apparatus for detecting an object using a multi-directional integral image according to an embodiment of the present invention.

Referring to FIG. 11, the apparatus for detecting an object using a multi-directional integral image according to the present embodiment includes an area segmentation unit 1110, an integral image calculation unit 1120, and an object detection unit 1130.

The area segmentation unit 1110 places windows having a size of x*y on a full image having w*h pixels so that they overlap each other at their edges, thereby segmenting the full image into a single area, a double area and a quadruple area.

In this case, each of x and y is one of natural numbers, wherein x and y are smaller than w and h, respectively.

In this case, a single direction is assigned to each of the windows, and one direction may be assigned to the single area, two directions may be assigned to the double area, and four directions may be assigned to the quadruple area.

In this case, two different directions may be assigned to the double area, and four different directions may be assigned to the quadruple area.

In this case, any one of the four different directions may be assigned to each of the windows.

In this case, the left and right side windows of the first direction windows having the direction may be second direction windows having the second direction, the upper and lower side windows of the first direction windows may be third direction windows having the third direction, and the upper and lower side windows of the second direction windows and the left and right side windows of the third direction windows may be fourth direction windows having the fourth direction.

In this case, the direction assigned to each window is a direction along which pixel values within the window are integrated, and the first direction may be a rightward-downward direction, the second direction may be a leftward-downward direction, the third direction may be a rightward-upward direction, and the fourth direction may be a leftward-upward direction.

The integral image calculation unit 1120 calculates a single directional integral image for the single area, and calculates multi-directional integral images for the double and quadruple areas.

In this case, the integral image calculation unit 1120 may include a single directional integral image calculation unit 1121 configured to calculate a single directional integral image for each of the single, double and quadruple areas along a single direction; an intersection integral image calculation unit 1122 configured to calculate intersection integral images for each of the double and quadruple areas along two directions; and a multi-directional integral image calculation unit 1123 configured to calculate multi-directional integral images for the double and quadruple areas using the single directional integral images and the intersection integral images.

In this case, the single directional integral image calculation unit 1121 may calculate a single directional integral image along the direction assigned to the single area in the case of the single area, may calculate a single directional integral image along any one of the two directions assigned to the double area in the case of the double area, and may calculate a single directional integral image along any one of the four directions assigned to the quadruple area in the case of the quadruple area.

In this case, the intersection integral image calculation unit 1122 may calculate intersection integral images along the two directions assigned to the double area in the case of the double area, and may calculate three intersection integral images along any three pairs of the four non-opposite direction pairs of the four directions assigned to the quadruple area in the case of the quadruple area.

In this case, the multi-directional integral image calculation unit 1123 may calculate the multi-directional integral image by subtracting the intersection integral image from the sum of single directional integral images along the respective directions assigned to the double area in the case of the double area, and may calculate the multi-directional integral image by subtracting the three intersection integral images from the sum of single directional integral images along the respective directions assigned to the quadruple area in the case of the quadruple area.

The object detection unit 1130 detects an object for the full image using the single directional integral images and the multi-directional integral images.

Figure 12:
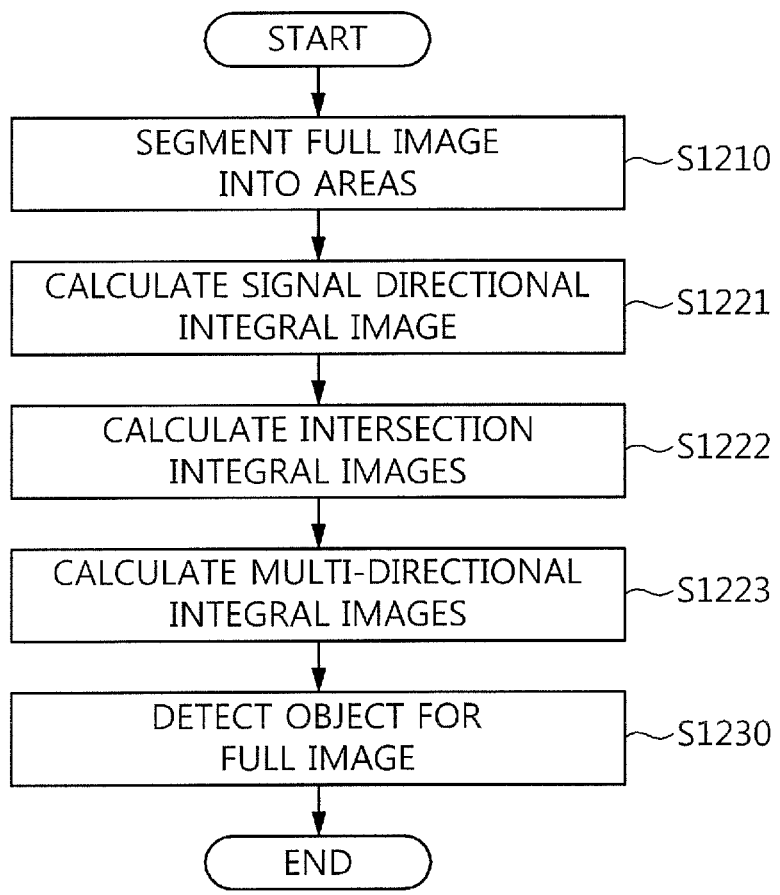
FIG. 12 is an operation flowchart illustrating a method of detecting an object using a multi-directional integral image according to an embodiment of the present invention.

FIG. 12 is an operation flowchart illustrating a method of detecting an object using a multi-directional integral image according to an embodiment of the present invention.

Referring to FIG. 12, in the method of detecting an object using a multi-directional integral image according to the present embodiment, windows having a size of x*y are placed on a full image having w*h pixels so that they overlap each other at their edges, thereby segmenting the full image into a single area, a double area and a quadruple area at step S1210.

In this case, each of x and y is one of natural numbers, wherein x and y are smaller than w and h, respectively.

In this case, a single direction is assigned to each of the windows, and one direction may be assigned to the single area, two directions may be assigned to the double area, and four directions may be assigned to the quadruple area.

In this case, two different directions may be assigned to the double area, and four different directions may be assigned to the quadruple area.

In this case, any one of the four different directions may be assigned to each of the windows.

In this case, the left and right side windows of first direction windows having the first direction may be second direction windows having the second direction, the upper and lower side windows of the first direction windows may be third direction windows having the third direction, and the upper and lower side windows of the second direction windows and the left and right side windows of the third direction windows may be fourth direction windows having the fourth direction.

In this case, the direction assigned to each window is a direction along which pixel values within the window are integrated, and the first direction may be a rightward-downward direction, the second direction may be a leftward-downward direction, the third direction may be a rightward-upward direction, and the fourth direction may be a leftward-upward direction.

Furthermore, in the method of detecting an object using a multi-directional integral image according to the present embodiment, a single directional integral image is calculated for each of the single, double and quadruple areas along a single direction at step S1221.

In this case, at step S1221, in the case of the single area, a single directional integral image may be calculated along the direction assigned to the single area, in the case of the double area, a single directional integral image may be calculated along any one of the two directions assigned to the double area, and, in the case of the quadruple area, a single directional integral image may be calculated along any one of the four directions assigned to the quadruple area.

Furthermore, in the method of detecting an object using a multi-directional integral image according to the present embodiment, intersection integral images are calculated for each of the double and quadruple areas along two directions at step S1222.

In this case, at step S1222, in the case of the double area, intersection integral images may be calculated along the two directions assigned to the double area, and, in the case of the quadruple area, three intersection integral images may be calculated along any three pairs of the four non-opposite direction pairs of the four directions assigned to the quadruple area.

In this case, with respect to steps S1221 and S1222, step S1221 may be performed after step S1222 has been performed. That is, intersection integral images may be calculated first, and then single directional integral images may be calculated.

Furthermore, in the method of detecting an object using a multi-directional integral image according to the present embodiment, multi-directional integral images are calculated for the double and quadruple areas using the single directional integral images and the intersection integral images at step S1223.

In this case, at step S1223, in the case of the double area, the multi-directional integral image may be calculated by subtracting the intersection integral image from the sum of single directional integral images along the respective directions assigned to the double area, and, in the case of the quadruple area, the multi-directional integral image may be calculated by subtracting the three intersection integral images from the sum of single directional integral images along the respective directions assigned to the quadruple area.

Furthermore, in the method of detecting an object using a multi-directional integral image according to the present embodiment, an object is detected for the full image using the single directional integral images and the multi-directional integral images at step S1230.

A method of detecting an object using a multi-directional integral image according to an embodiment of the present invention may be implemented as a program that can be executed by various computer means and recorded on a computer readable storage medium. In this case, the computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and the vice versa.

An apparatus and method of detecting an object using a multi-directional integral image according to embodiments of the present invention are not limited to the configurations and operations of the above-described embodiments, but all or some of the embodiments may be selectively combined and configured so that the embodiments may be modified in various ways.

At least some embodiments of the present invention provide an apparatus and method for detecting object using a multi-directional integral image, which are capable of, in the calculation of partial integral images required for the detection of an object, performing calculations along four different directions with respect to a non-overlap area and calculating an intersection integral image for overlap directions with respect to an overlap area, thereby reducing the amount of computation for the overlap area.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. One or more non-transitory storage devices storing instructions that are executable to perform operations comprising:
   segmenting a full image having w*h pixels into single, double, and quadruple areas, wherein windows having a size of x*y in the full image are overlapped each other in horizontal and vertical directions with predetermined width m and length n,
   wherein an area of each window having no overlap is the single area, areas of each window having overlaps with neighbor windows in a diagonal direction are the quadruple areas, and areas of each window having overlaps with neighbor windows in vertical and horizontal directions except the quadruple areas are the double areas,
   wherein a single direction is assigned to each of the windows, and one direction is assigned to the single area, two directions are assigned to the double area, and four directions are assigned to the quadruple area;
   calculating a single directional integral image for the single area and calculate multi-directional integral images for the double and quadruple areas; and
   detecting an object pattern area in the full image using the single directional integral image and the multi-directional integral images;
   wherein each of w and h is one of natural numbers, and each of x and y is one of natural numbers, wherein x and y are smaller than w and h, respectively.

2. The one or more non-transitory storage devices of claim 1, wherein calculating a single directional integral image and multi-directional integral images comprises:
   calculating a single directional integral image for each of the single, double and quadruple areas along a single direction;
   calculating intersection integral images for each of the double and quadruple areas along two directions; and
   calculating multi-directional integral images for the double and quadruple areas using the single directional integral images and the intersection integral images.

3. The one or more non-transitory storage devices of claim 2, wherein calculating a single directional integral image calculates a single directional integral image along the direction assigned to the single area with respect to the single area, calculates a single directional integral image along any one of the two directions assigned to the double area with respect to the double area, and calculates a single directional integral image along any one of the four directions assigned to the quadruple area with respect to the quadruple area.

4. The one or more non-transitory storage devices of claim 2, wherein calculating intersection integral images calculates intersection integral images along the two directions assigned to the double area with respect to the double area, and calculates three intersection integral images along any three pairs of the four non-opposite direction pairs of the four directions assigned to the quadruple area with respect to the quadruple area.

5. The one or more non-transitory storage devices of claim 2, wherein calculating multi-directional integral images calculates the multi-directional integral image by subtracting the intersection integral image from a sum of single directional integral images along the respective directions assigned to the double area with respect to the double area, and calculates the multi-directional integral image by subtracting the three intersection integral images from a sum of single directional integral images along the respective directions assigned to the quadruple area with respect to the quadruple area.

6. The one or more non-transitory storage devices of claim 5, wherein two different directions are assigned to the double area, and four different directions are assigned to the quadruple area.

7. The one or more non-transitory storage devices of claim 1, wherein any one of the four different directions is assigned to each of the windows.

8. The one or more non-transitory storage devices of claim 7, wherein left and right side windows of first direction windows having a first direction are second direction windows having a second direction, upper and lower side windows of the first direction windows are third direction windows having a third direction, and upper and lower side windows of the second direction windows and left and right side windows of the third direction windows are fourth direction windows having a fourth direction.

9. The one or more non-transitory storage devices of claim 8, wherein the direction assigned to each of the windows is a direction along which pixel values within the window are integrated, and the first direction is a rightward-downward direction, the second direction is a leftward-downward direction, the third direction is a rightward-upward direction, and the fourth direction is a leftward-upward direction.

10. A method of detecting an object using a multi-directional integral image, comprising:
    segmenting a full image having w*h pixels into single, double, and quadruple area by overlapping windows having a size of x*y in the full image in horizontal and vertical directions with predetermined width m and length n, wherein an area of each window having no overlap is the single area, areas of each window having overlaps with neighbor windows in a diagonal direction are the quadruple areas, and areas of each window having overlaps with neighbor windows in vertical and horizontal directions except the quadruple areas are the double areas,
    wherein a single direction is assigned to each of the windows, and one direction is assigned to the single area, two directions are assigned to the double area, and four directions are assigned to the quadruple area;
    calculating a single directional integral image for the single area, and calculating multi-directional integral images for the double and quadruple areas; and
    detecting an object pattern area for the full image using the single directional integral image and the multi-directional integral images;
    wherein each of w and h is one of natural numbers, and each of x and y is one of natural numbers, wherein x and y are smaller than w and h, respectively.

11. The method of claim 10, wherein calculating the integral images comprises:
    calculating a single directional integral image for each of the single, double and quadruple areas along a single direction;
    calculating intersection integral images for each of the double and quadruple areas along two directions; and
    calculating multi-directional integral images for the double and quadruple areas using the single directional integral images and the intersection integral images.

12. The method of claim 11, wherein calculating the single directional integral images comprises:
    with respect to the single area, calculating a single directional integral image along the direction assigned to the single area;
    with respect to the double area, calculating a single directional integral image along any one of the two directions assigned to the double area; and
    with respect to the quadruple area, calculating a single directional integral image along any one of the four directions assigned to the quadruple area.

13. The method of claim 11, wherein calculating the intersection integral images comprises:
    with respect to the double area, calculating intersection integral images along the two directions assigned to the double area; and
    with respect to the quadruple area, calculating three intersection integral images along any three pairs of the four non-opposite direction pairs of the four directions assigned to the quadruple area.

14. The method of claim 11, wherein calculating the multi-directional integral images comprises:
    with respect to the double area, calculating the multi-directional integral image by subtracting the intersection integral image from a sum of single directional integral images along the respective directions assigned to the double area; and
    with respect to the quadruple area, calculating the multi-directional integral image by subtracting the three intersection integral images from a sum of single directional integral images along the respective directions assigned to the quadruple area.

15. The method of claim 14, wherein two different directions are assigned to the double area, and four different directions are assigned to the quadruple area.

16. The method of claim 10, wherein any one of the four different directions is assigned to each of the windows.

17. The method of claim 16, wherein left and right side windows of first direction windows having a first direction are second direction windows having a second direction, upper and lower side windows of the first direction windows are third direction windows having a third direction, and upper and lower side windows of the second direction windows and left and right side windows of the third direction windows are fourth direction windows having a fourth direction.

18. The method of claim 17, wherein the direction assigned to each of the windows is a direction along which pixel values within the window are integrated, and the first direction is a rightward-downward direction, the second direction is a leftward-downward direction, the third direction is a rightward-upward direction, and the fourth direction is a leftward-upward direction.

19. A method of detecting an object using a multi-directional integral image, comprising:
    segmenting a full image having w*h pixels into single, double, and quadruple area by overlapping windows having a size of x*y in the full image in horizontal and vertical directions with predetermined width m and length n, wherein an area of each window having no overlap is the single area, areas of each window having overlaps with neighbor windows in a diagonal direction are the quadruple areas, and areas of each window having overlaps with neighbor windows in vertical and horizontal directions except the quadruple areas are the double areas, wherein a single direction is assigned to each of the windows, and one direction is assigned to the single area, two directions are assigned to the double area, and four directions are assigned to the quadruple area;

calculating a single directional integral image for the single area, and calculating multi-directional integral images for the double and quadruple areas, wherein the single directional integral image is an image disposed in the single area and multi-directional integral images are an images disposed in the double or quadruple areas; and detecting an object pattern area for the full image using the single directional integral image and the multi-directional integral images;

wherein each of w and h is one of natural numbers, and each of x and y is one of natural numbers, wherein x and y are smaller than w and h, respectively.

* * * * *